United States Patent [19]

Öhrn

[11] 4,051,635
[45] Oct. 4, 1977

[54] APPARATUS FOR FINISHING SHAPED ARTICLES

[75] Inventor: Gösta Arvid Valdemar Öhrn, Gemla, Sweden

[73] Assignee: AB Casco, Stockholm, Sweden

[21] Appl. No.: 699,930

[22] Filed: June 25, 1976

[30] Foreign Application Priority Data

June 25, 1975 Sweden .............................. 7507292

[51] Int. Cl.² .......................... B24B 5/04; B24B 9/00
[52] U.S. Cl. .............................. 51/108 R; 51/105 R; 51/145 T; 51/237 R; 51/237 T

[58] Field of Search ............. 51/97 R, 97 NC, 105 R, 51/105 LG, 106 R, 106 LG, 108 R, 124 R, 124 LG, 132, 144, 145 R, 145 T, 234, 237 R, 237 T; 90/20

[56] References Cited

U.S. PATENT DOCUMENTS

| 2,775,073 | 12/1956 | Ingersoll | 51/106 R |
| 3,315,415 | 4/1967 | Lannom | 51/97 R |
| 3,399,498 | 9/1968 | Lampani | 51/145 R |

Primary Examiner—Harold D. Whitehead
Assistant Examiner—Nicholas P. Godici
Attorney, Agent, or Firm—Fred Philpitt

[57] ABSTRACT

An apparatus for finishing shaped articles which includes a working table, a finishing tool and movable mounting on said table for moving a shaped article toward and away from said finishing tool.

7 Claims, 2 Drawing Figures

FIG. I

APPARATUS FOR FINISHING SHAPED ARTICLES

BACKGROUND

In the manufacturing of shaped articles, for example by compression moulding of moulding compounds containing curing resins, some excess material is pressed out between the mould parts in the form of a burr. This burr must be removed from the article after its release from the mould and the edges of the article must be finished by trimming and perhaps polishing. This finishing often requires considerable handwork. In order to avoid this, finishing apparatus has recently been introduced in which the article is placed on a rotating disc whereafter the articles are brought into contact with a tool. This contacting has however involved many problems.

In some cases the rotating disc is mounted in a fixed position while the treating tools are movably mounted for contact with the article. Since tool and motor are usually built into one single unit for practical reasons, this arrangement means that a very heavy weight must be moved to and pressed against the article, which involves problems in providing strong enough holding means for the tool unit to avoid vibrations, problems, in the adaption to different article shapes and sizes, problems in moving the tool unit quickly into contact with the article, and problems in regulating a slight pressure between the article and the heavy tool unit.

In other cases the tool is mounted in a fixed position while the rotary article holder is movably mounted and brought into contact with the tool by means of a spring pressure. In these cases problems have arisen both with the arrangement of the driving means for the rotating article holder, which arrangement tends to be complicated, and with the spring pressure characteristics, which give rise to bouncing and vibrating effects between tool and article and an irregular treating result.

For these reasons hitherto used finishing apparatus have in general been usable only for articles of simple shape, e.g. plain dishes, and have not been usable for articles of more complicated shape.

THE PRESENT INVENTION

I have found that by placing the article holder movably in one end of a pivoting arm it is possible to, by simple means and in a highly controlled way, bring the article in contact with the stationary tool unit. By actuating the rotary article holding means with the aid of a driving shaft extending from the table, and necessary transmission means, the problems involved in arranging the driving of the holder is solved in a simple and effective way. By creating the necessary contact pressure between tool and article by means of a brake system affecting some part of the driving system, an even, constant and non-vibrating pressure force is obtained, which force can be easily regulated and made independent of the movements of the pivoting arm when an irregular shaped article is treated.

The invention will now be described more in detail in connection with the attached drawings.

Figure 1:
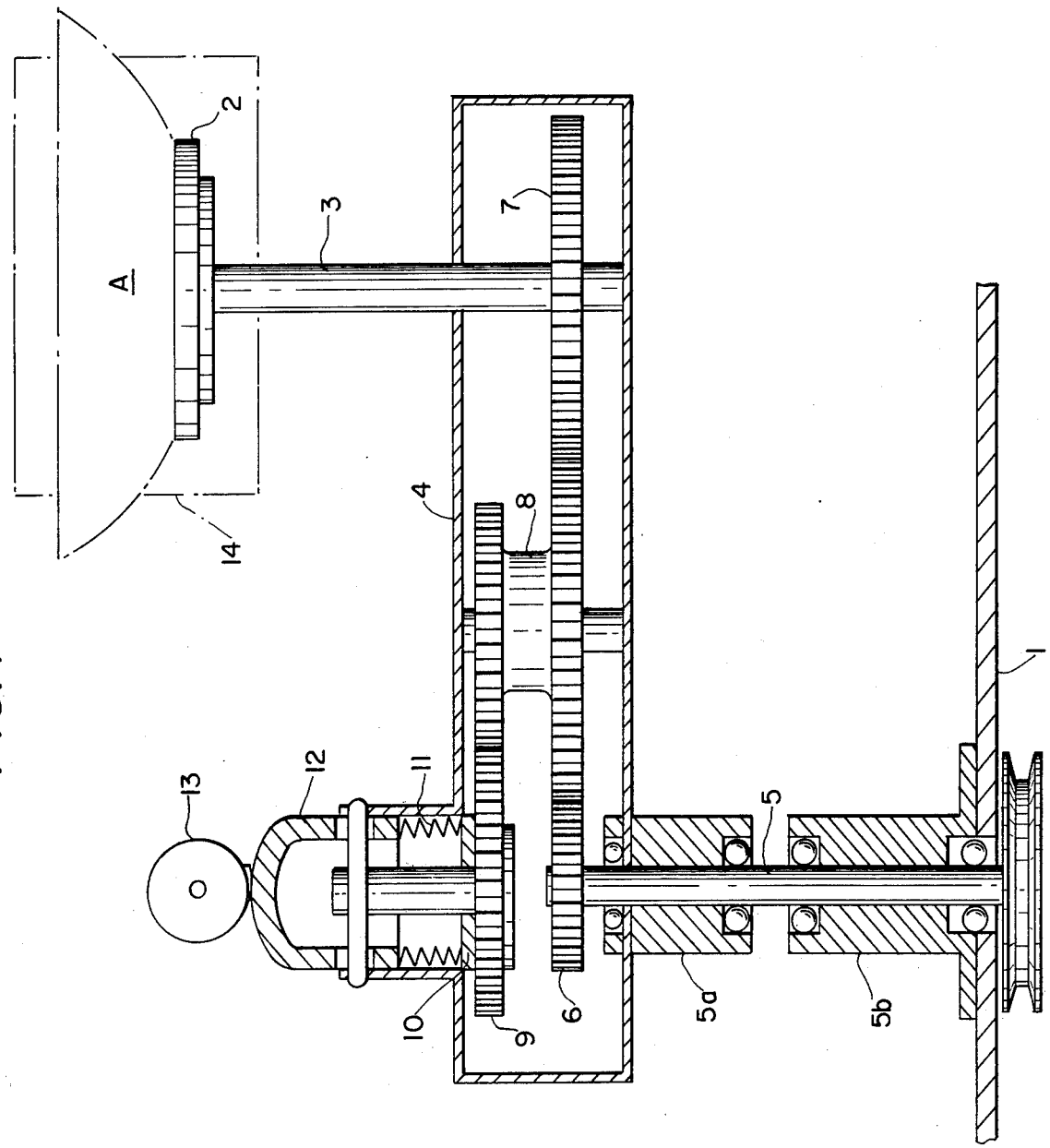
FIG. 1 is a sectional view through one embodiment of the invention.

A rotary holding disc 2 for supporting the article A to be treated is mounted adjacent the outer end of a pivoting arm 4. The disc 2 can rotate around a rotary holder shaft 3 that is mounted near the outer end of the arm 4. The inner end of the pivoting arm 4 is journalled in bearings to a working table 1. This can be achieved by attaching the bearings 5a and 5b to a driving shaft 5 that is mounted perpendicular to the table 1. Mounted in this way the pivoting arm 4 can rotate freely around the axis of shaft 5. A driving gear wheel 6 is attached to the upper end of the driving shaft 5. The gear wheel 6 engages the lower gear of the double gear wheel 8. The lower gear of the double gear wheel 8 is located around the lower end of the rotary shaft 3a. The upper gear of the double gear wheel 8 engages a brake wheel 9, which is given a strongly reduced speed through a suitable selection of gear ratios between gear wheels 6, 8 and 9. The gear wheel 9 is acted upon by a brake lining 10 which is actuated by an adjustable brake force e.g., by means of pressure springs 11. The tension in the springs can in turn be influenced by means of a hood 12 and an adjustable cam 13.

Any suitable actuating means may be used to rotate the driving shaft 5, and this driving force is transmitted to the holder axis 3 via driving gear wheel 6, double gear wheel 8 and holder gear wheel 7, thereby causing the holder disc 2 and the article A to rotate. The rotation of the driving shaft 5 is also transmitted to the brake wheel 9 via driving gear wheel 6 and double gear wheel 8. By forcing the brake lining 10 against the flat surface of brake wheel 9 by means of spring 11, hood 12, and cam 13, a braking force is applied to the brake wheel 9 and a reacting force is induced in the pivoting arm 4 thereby bringing the article into contact with, and maintaining a contact pressure against, the treating tool, schematically indicated in the drawing at 14.

To obtain the best treating results, the gear ratio between the driving wheel 6, the double wheel 8 and the brake wheel 9 should be selected in such a way that a constant working pressure is obtained independently of the shape of the articles, e.g. oval or polygonal. This is achieved when a movement of the pivoting arm very little affects the speed of the brake wheel 9. In one embodiment of the invention the driving gear wheel 6 has 14 cogs, the lower gear of the double wheel 8 has 36, the top gear of the double wheel 8 has twenty and the brake wheel 9 has thirty cogs. In this case, in order to lengthen the pivoting arm, two smaller gear wheels with twenty cogs each are inserted between double wheel 8 and holder gear wheel 7, which has 36 cogs. With this construction a contact pressure highly independent of article shape has been obtained.

Figure 2:
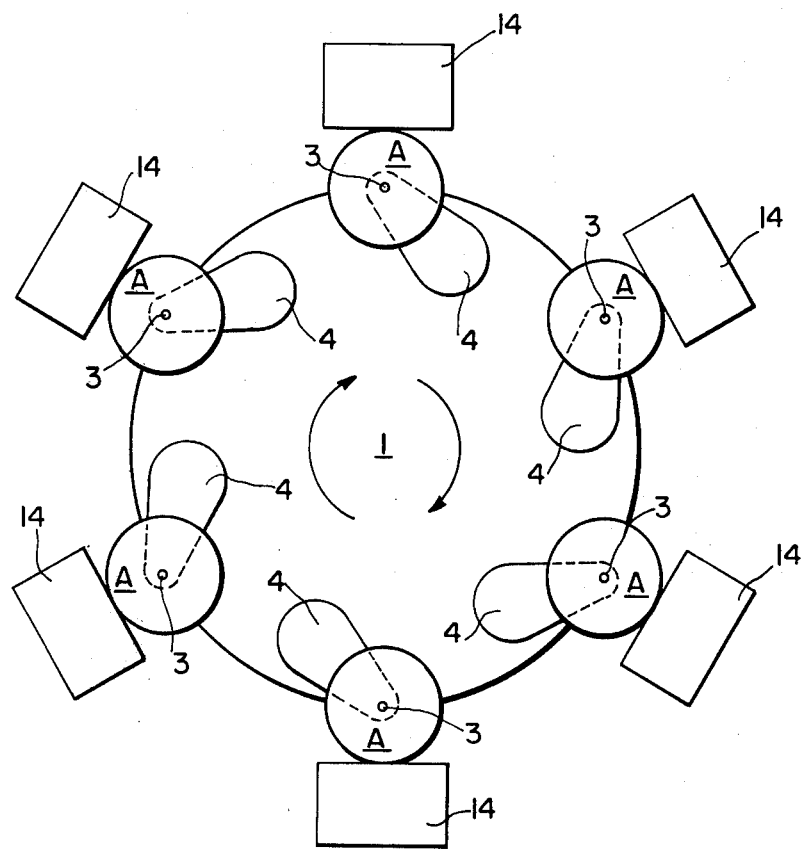
FIG. 2 is a top view of a second embodiment wherein several pivoting arms are attached to a rotary working table.

Since several treating steps are often necessary to finish an article, it is preferred to fix several pivoting arms 4 to the working table 1 so that several treating stations, with the same or different treating tools 14 are arranged around the table 1 and that the table is mounted rotary to enable continuous treating of each article on each arm in the different treating stations see FIG. 2.

In this case it is preferred that when shifting treating stations, the hood 12 of each pivoting arm 4 is run into engagement with separate cams 13 for each treating station, thereby making it possible to select the contact pressure individually for each treating step. In this way it is also possible to release the hood 12 from any influence during the station shift and thereby prevent undesired movements of the arm 4 during this procedure.

Since in this case the arm 4 is released also from all stabilizing forces, it may be necessary to provide some kind of dampening means or guiding means for the movement of the arm 4.

The invention is not restricted to the embodiment discussed above, but can be varied in many different ways within the limits of the following claims. For example the arrangement of shaft and gear wheels can be made in many other ways than those shown or entirely different driving means can be used e.g., wires. The brake means can affect some other part of the driving or transmission system, because the only necessary condition is that the brake system gives a reactive force component in the pivoting plane of the arm. Although it is in general most practical to let the driving shaft be concentric with the journalling axis of the pivoting arm in view of the simplicity and movability of the arm other arrangements are possible.

What is claimed is:

1. In the known apparatus for finishing shaped articles and the like which includes the combination of a working table, a finishing tool and movable mounting means for shaped articles associated with said table for moving a shaped article toward and away from said finishing tool, the improvement comprising a movable mounting means that includes
  a. a pivoting arm, having an inner end and an outer end,
  b. a driving shaft extending from the working table to the inner end of said pivoting arm
  c. an article holding means supported on a rotary shaft, said rotary shaft extending from the outer end of said pivoting arm,
  d. means for driving said driving shaft,
  e. transmission means interconnecting said driving shaft and said rotary shaft,
  f. braking means attached to the pivoting arm,
  g. means for periodically moving said braking means into contact with said transmission means so as to induce a reactive force in the pivoting arm which will bring the article into contact with the finishing tool.

2. Apparatus according to claim 1 characterized in that the driving shaft is concentric with the journalling axis of the pivoting arm and that the upper end of the driving shaft is equipped with a driving gear wheel, that the rest of the transmission means consists of at least one transmission gear wheel and that the braking means affects at least one gear wheel.

3. Apparatus according to claim 2 characterized in that the transmission gear wheels includes a double gear wheel havng one end connected to a separate brake gear wheel that is acted upon by the brake means.

4. Apparatus according to claim 3 characterized in brake means which acts upon the brake wheel is adjustable.

5. Apparatus according to claim 2 characterized in that the brake means is acted upon by means of pressure springs the tension of which is influenced by means of a hood and an adjustable cam.

6. Apparatus according to claim 5 characterized in that the gear ratio between the driving wheel, the double wheel and the brake wheel is such that a constant working pressure is obtained independently of the shape of the articles.

7. Apparatus according to claim 6 characterized in that several pivoting arms are fixed to the working table that several treating stations are arranged around the table, and that the table is rotary to enable continuous treating of each article on each arm in the different treating stations.

* * * * *